US011223267B2

(12) United States Patent
Wang et al.

(10) Patent No.: US 11,223,267 B2
(45) Date of Patent: Jan. 11, 2022

(54) ELECTROMAGNETIC PUMP

(71) Applicant: ALEADER VISION TECHNOLOGY CO., LTD, Guangdong (CN)

(72) Inventors: Jinfeng Wang, Guangdong (CN); Tao Liu, Guangdong (CN)

(73) Assignee: ALEADER VISION TECHNOLOGY CO., LTD

( * ) Notice: Subject to any disclaimer, the term of this patent is extended or adjusted under 35 U.S.C. 154(b) by 547 days.

(21) Appl. No.: 16/302,691

(22) PCT Filed: Apr. 2, 2018

(86) PCT No.: PCT/CN2018/081516
§ 371 (c)(1),
(2) Date: Nov. 19, 2018

(87) PCT Pub. No.: WO2019/052154
PCT Pub. Date: Mar. 21, 2019

(65) Prior Publication Data
US 2021/0226522 A1      Jul. 22, 2021

(30) Foreign Application Priority Data

Sep. 14, 2017   (CN) .......................... 201710826596.4

(51) Int. Cl.
*H02K 44/04*       (2006.01)
*F04B 17/03*       (2006.01)
*F04B 53/14*       (2006.01)

(52) U.S. Cl.
CPC ............. *H02K 44/04* (2013.01); *F04B 17/03* (2013.01); *F04B 53/14* (2013.01)

(58) Field of Classification Search
CPC ......... F04B 17/03; F04B 53/14; H02K 44/04; H02K 44/06
See application file for complete search history.

(56) References Cited

U.S. PATENT DOCUMENTS

| | | | | |
|---|---|---|---|---|
| 4,212,592 A | * | 7/1980 | Olich ..................... | H02K 44/06 417/50 |
| 4,668,170 A | * | 5/1987 | Barzantny .............. | H02K 44/06 266/234 |
| 5,542,308 A | * | 8/1996 | Miller ..................... | F02B 41/04 74/413 |
| 7,316,800 B1 | * | 1/2008 | Dardik ................. | B22D 39/003 266/237 |

(Continued)

FOREIGN PATENT DOCUMENTS

| | | |
|---|---|---|
| CN | 201335610 | 10/2009 |
| CN | 201335610 Y | 10/2009 |

(Continued)

OTHER PUBLICATIONS

Extended European Search Report dated Feb. 28, 2020. European Application No. 1880352.6.

*Primary Examiner* — Patrick Hamo
(74) *Attorney, Agent, or Firm* — McDonald Hopkins LLC

(57) ABSTRACT

The present disclosure relates to a technical field of fluid delivering. An electromagnetic pump is provided. The electromagnetic pump includes a drive mechanism and a magnetic assembly, where the magnetic assembly is configured to be driven by the drive mechanism to generate a varying magnetic field.

10 Claims, 6 Drawing Sheets

(56) References Cited

U.S. PATENT DOCUMENTS

| | | | | |
|---|---|---|---|---|
| 7,994,661 | B2 * | 8/2011 | Qiu | H02K 41/03 |
| | | | | 310/12.24 |
| 8,585,962 | B2 * | 11/2013 | Takahashi | C22B 21/0084 |
| | | | | 266/234 |
| 8,703,043 | B2 * | 4/2014 | Takahashi | H02K 44/04 |
| | | | | 266/200 |

FOREIGN PATENT DOCUMENTS

| | | |
|---|---|---|
| CN | 201560872 U | 8/2010 |
| CN | 202334245 U | 7/2012 |
| CN | 202718843 | 2/2013 |
| CN | 106972731 A | 7/2017 |
| CN | 107394987 A | 11/2017 |
| EP | 2206998 | 7/2010 |
| FR | 2459577 | 1/1981 |
| GB | 661756 | 11/1951 |
| JP | 05019087 | 1/1993 |
| JP | 2004254437 | 9/2004 |
| JP | 2011139611 | 7/2011 |
| JP | 5496647 B2 | 5/2014 |
| JP | 2015023640 | 2/2015 |
| JP | 2015086742 A | 5/2015 |

* cited by examiner

ELECTROMAGNETIC PUMP

CROSS-REFERENCE TO RELATED APPLICATION

This application is a 35 U.S.C. 371 national stage filing of PCT Application No. PCT/CN2018/081516 filed on Apr. 2, 2018, which claims priority to Chinese Patent Application No. 201710826596.4 filed on Sep. 14, 2017, each of which are incorporated herein in their entirety by reference.

TECHNICAL FIELD

The present disclosure relates to the technical field of fluid transmission, and for example, to an electromagnetic pump.

BACKGROUND

An electromagnetic pump is a pump in which an energized fluid in a magnetic field flows in a certain direction under the influence of electromagnetism. The electromagnetic pump is an apparatus that utilizes interaction of the magnetic field and a current in a conductive fluid to cause the fluid to be subjected to electromagnetism to generate a pressure gradient, thereby promoting motion of the fluid. In practice, electromagnetic pumps are mostly used to pump liquid metal, so they are also called electromagnetic pumps for liquid metal.

The electromagnetic pump generates an alternating magnetic field by introducing an alternating current into a coil, and the liquid metal is driven by the alternating magnetic field generated by the coil to flow in an expected direction. This type of electromagnetic pump has higher requirements on current and voltage and presents safety hazards.

SUMMARY

The present disclosure provides an electromagnetic pump with the advantages of safety and reliability.

An electromagnetic pump provided by the present disclosure includes a drive mechanism and a magnetic assembly, wherein the magnetic assembly is configured to be driven by the drive mechanism to generate a varying magnetic field.

Optionally, the magnetic assembly includes at least one magnet group, the at least one magnet group includes a first magnet and a second magnet which are disposed at an interval, and a magnetic pole polarity of a preset end of the first magnet adjacent to the magnet group is opposite to a magnetic pole polarity of a preset end of the second magnet adjacent to the magnet group; and the magnet group is configured to be driven by the drive mechanism to rotate around an axis of the magnetic assembly.

Optionally, the magnetic pole polarity of the preset end of the first magnet close to the magnet group being opposite to the magnetic pole polarity of the preset end of the second magnet adjacent to the magnet group refers to that: a magnetic pole of a first end of the first magnet adjacent to the magnet group is an S pole and a magnetic pole of a first end of the second magnet adjacent to the magnet group is an N pole; alternatively, the magnetic pole of the first end of the first magnet adjacent to the magnet group is the N pole and the magnetic pole of the first end of the second magnet adjacent to the magnet group is the S pole.

Optionally, the magnetic assembly includes at least two magnet groups, and a space is provided between each two adjacent ones of the magnet groups.

Optionally, the magnetic assembly further includes a base connected to the drive mechanism and a positioning sleeve fixed on the base; and the positioning sleeve is provided with a first placing groove and a second placing groove which are disposed at an interval, the first magnet is disposed in the first placing groove, and the second magnet is disposed in the second placing groove.

Optionally, the electromagnetic pump includes a tank and a liquid ejecting apparatus; a liquid outlet region at a bottom of the tank is provided with a first groove and a second groove surrounding the first groove, and a first end of the second groove is communicated with the first groove; and the liquid ejecting apparatus includes a seal plate attached above the liquid outlet region and a flow guiding column disposed on the seal plate, wherein the seal plate is provided with a first through hole in communicated with a second end of the second groove, and a bottom of the flow guiding column is communicated with the first groove.

Optionally, the magnetic assembly is disposed under the tank and an axis of the flow guiding column is in line with an axis of the magnetic assembly; and a gap is provided between the magnetic assembly and the tank.

Optionally, an upper portion of the tank is provided with a feed pipe.

Optionally, a lower portion of the tank is provided with a slag discharging pipe.

Optionally, the liquid ejecting apparatus further includes a nozzle disposed outside the tank; and an end of the flow guiding column facing away from the first groove is communicated with the nozzle.

Optionally, the drive mechanism includes an electric motor; and an axis of the magnetic assembly is in line with an axis of the electric motor.

Optionally, the drive mechanism includes a crank-link mechanism; and the crank-link mechanism includes a cylinder and a connecting rod, a first end of the connecting rod is hinged to a drive end of the cylinder, and a second end of the connecting rod is hinged to the magnetic assembly.

The electromagnetic pump provided by the present disclosure can avoid safety hazards caused by a high voltage conversion by providing a drive mechanism to drive the magnetic assembly to generate an alternating magnetic field.

IN THE DRAWINGS

Figure 1:
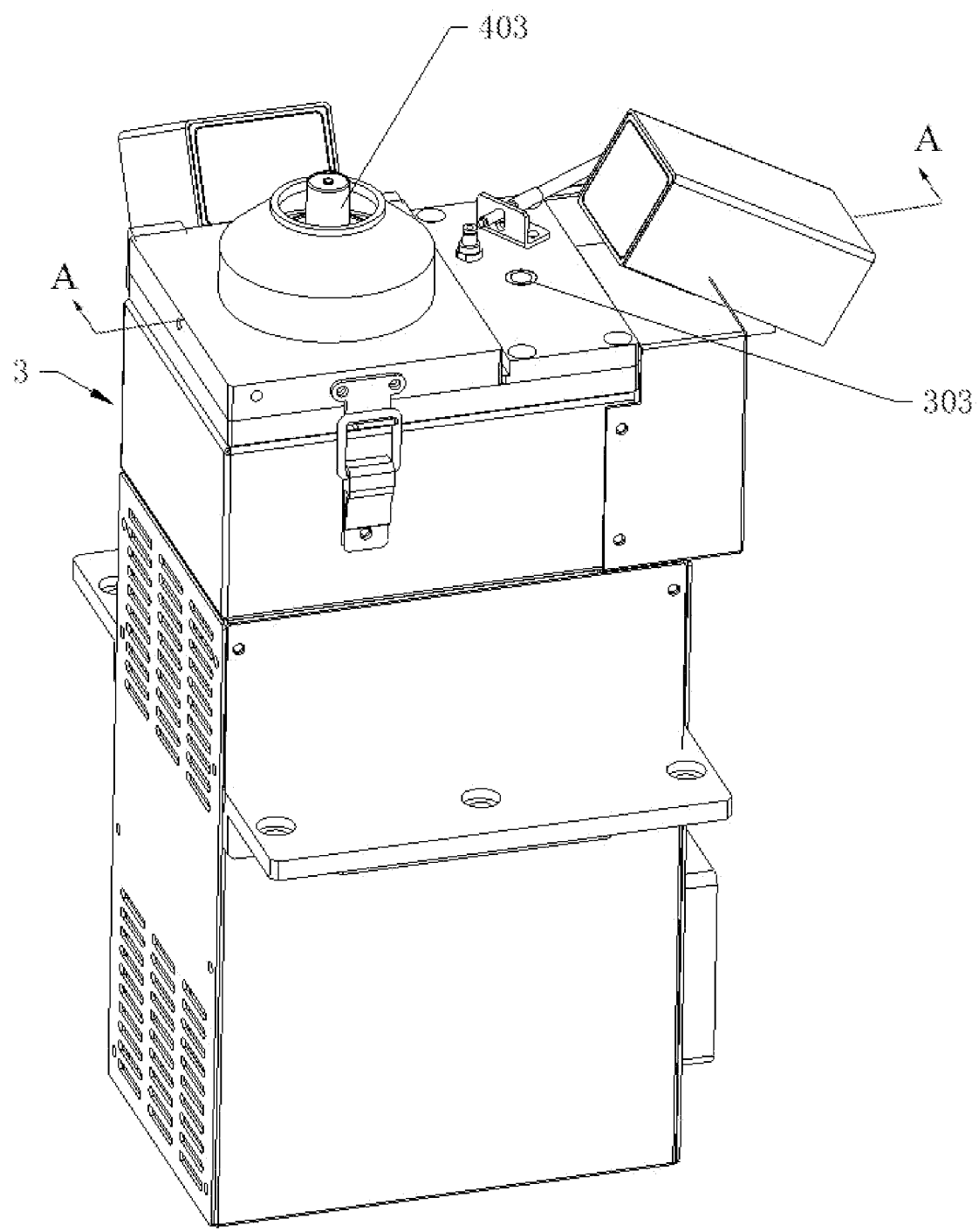
FIG. 1 is a structural diagram of an electromagnetic pump according to an embodiment 1.
Figure 2:
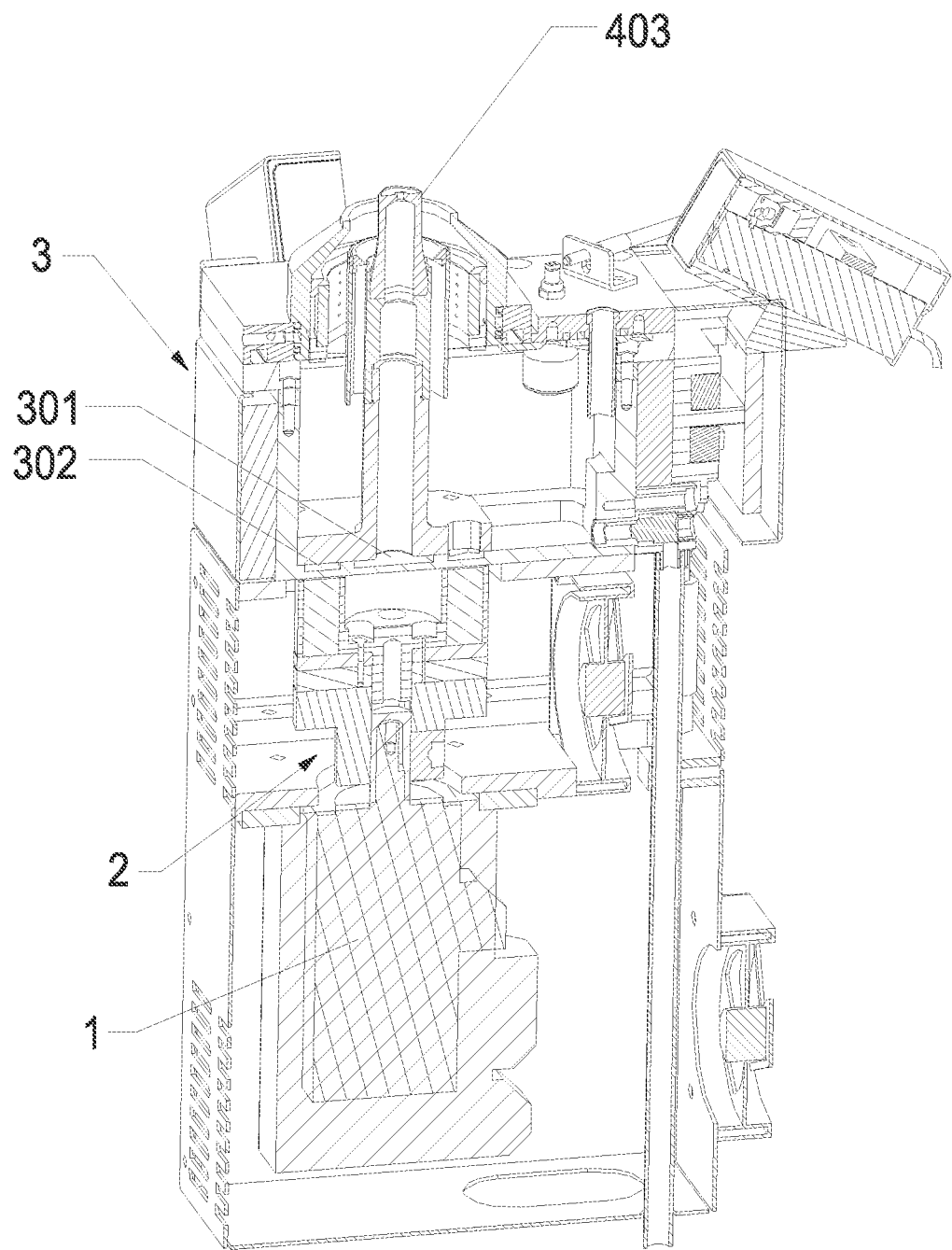
FIG. 2 is a half-sectional view of the electromagnetic pump according to the embodiment 1 along line A-A.
Figure 3:
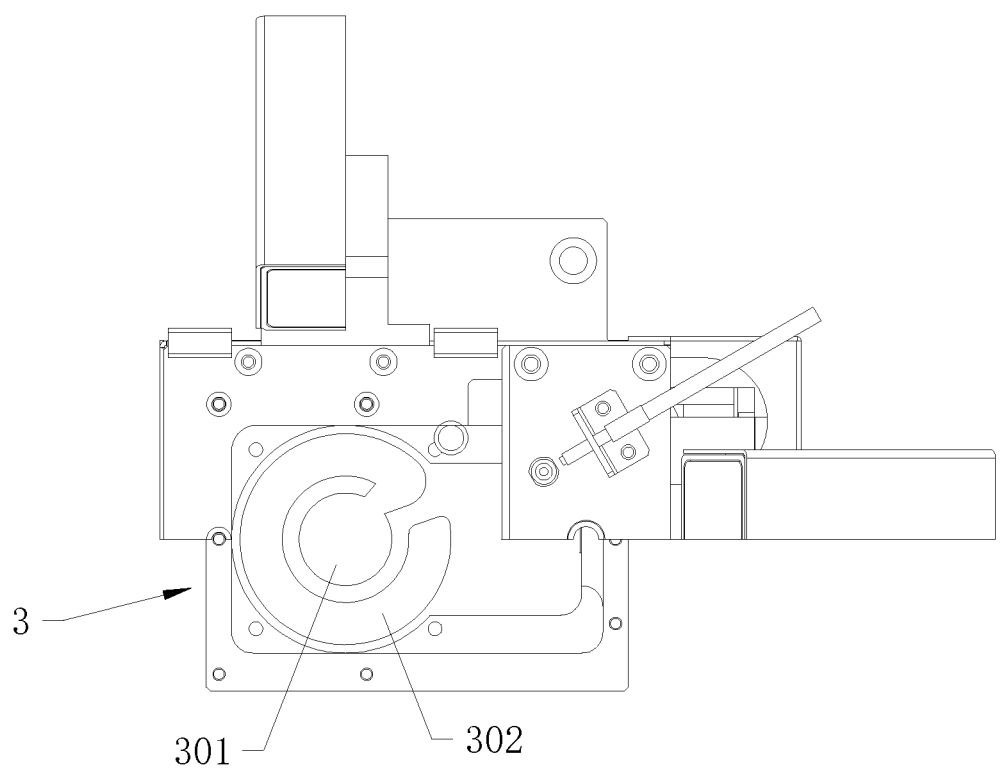
FIG. 3 is a structural diagram of a liquid outlet region according to the embodiment 1.
Figure 4:
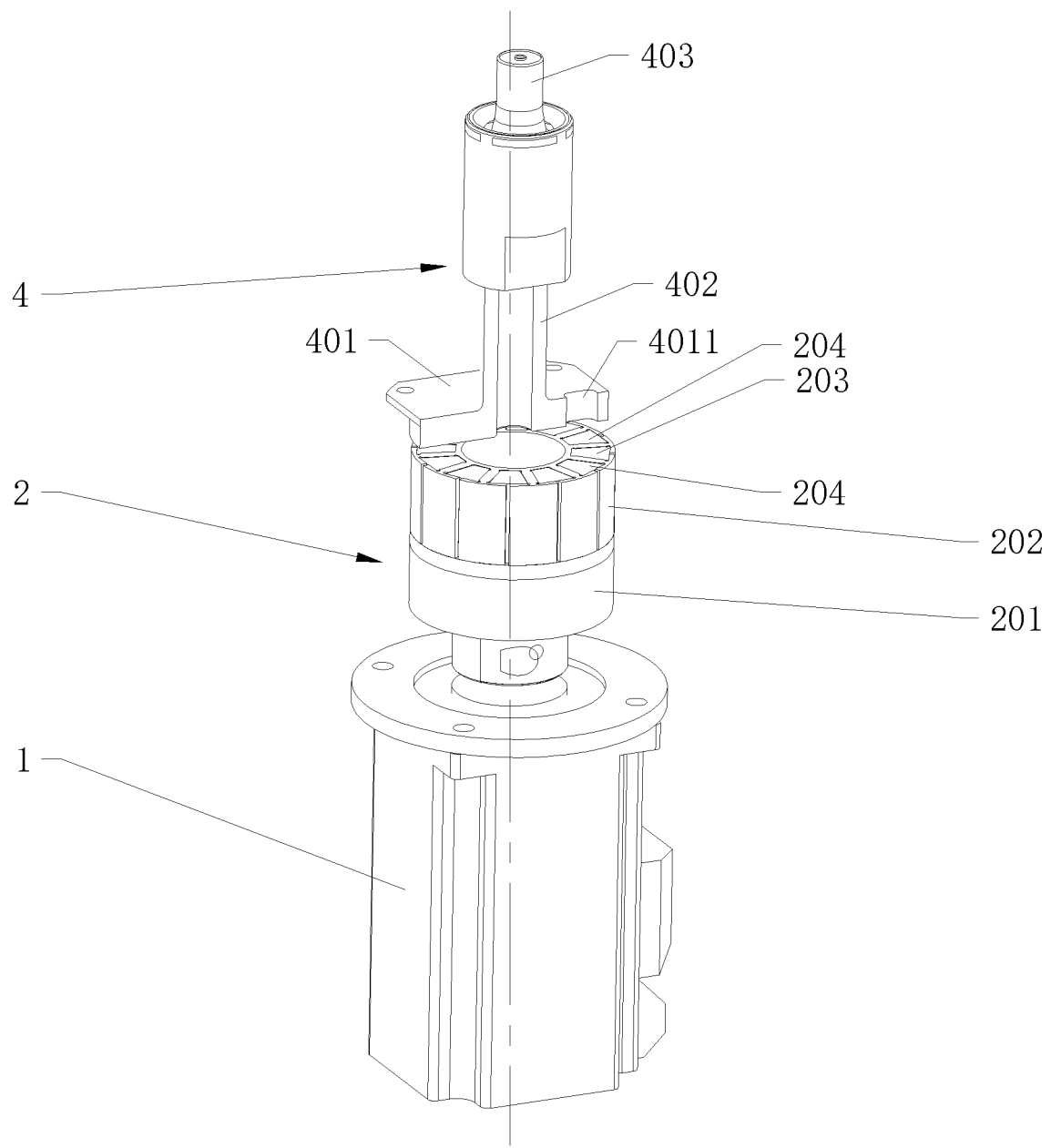
FIG. 4 is a structural diagram of a magnetic assembly according to the embodiment 1.

1-Electric motor;
2-Magnetic assembly; 201-Base; 202-Positioning sleeve; 203-First magnet; 204-Second magnet;
3-Tank; 301-First groove; 302-Second groove; 303-Feed pipe;
4-Liquid ejecting apparatus; 401-Seal plate; 4011-First through hole; 402-Flow guiding column; 403-Nozzle;

5-Cylinder; and
6-Connecting rod.

DETAILED DESCRIPTION

Embodiment 1

As shown in FIGS. 1 to 4, an electromagnetic pump includes a drive mechanism and a magnetic assembly 2 which is driven by the drive mechanism to generate a varying magnetic field. The drive mechanism may be an electric motor 1, and referring to FIG. 4, the magnetic assembly 2 includes a base 201, a positioning sleeve 202, and a plurality of magnet groups disposed at intervals. Each of the magnet groups includes a first magnet 203 and a second magnet 204 which are disposed at intervals, and a magnetic pole polarity of a first end of the first magnet 203 adjacent to the magnet groups is opposite to a magnetic pole polarity of a first end of the second magnet 204 adjacent to the magnet groups. The base 201 is fixedly connected to a output shaft of the electric motor 1 to ensure that the magnet groups are driven by the drive mechanism to rotate around an axis of the magnetic assembly 2. The positioning sleeve 202 is fixed on the base 201 and provided with a plurality of first placing grooves and second placing grooves which are disposed at intervals and arranged around the axis of the magnetic assembly 2, the first magnet 203 is disposed in the first placing groove, and the second magnet 204 is disposed in the second placing groove. Optionally, the magnetic pole polarity of the first end of the first magnet 203 adjacent to the magnet group (an end facing away from the electric motor 1) being opposite to the magnetic pole polarity of the first end of the second magnet 204 adjacent to the magnet groups (an end facing away from the electric motor 1) refers to that: a magnetic pole of the first end of the first magnet 203 adjacent to the magnet groups is an S pole, a magnetic pole of the first end of the second magnet 204 adjacent to the magnet groups is an N pole, a magnetic pole of a first end of the first magnet 203 facing away from the magnet groups is the N pole, and a magnetic pole of a first end of the second magnet 204 facing away from the magnet group is the S pole; alternatively, the magnetic pole of the first end of the first magnet 203 adjacent to the magnet groups is the N pole, the magnetic pole of the first end of the second magnet 204 adjacent to the magnet groups is the S pole, the magnetic pole of the first end of the first magnet 203 facing away from the magnet group is the S pole, and the magnetic pole of the first end of the second magnet 204 facing away from the magnet group is the N pole.

Optionally, when the electric motor 1 is in operation, the magnetic assembly 2 rotates around the axis of itself, and the first magnet 203 and the second magnet 204 also rotate accordingly. Since the magnetic pole polarity of an end of the first magnet 203 is different from the magnetic pole polarity of a same end of the second magnet 204, the magnetic assembly 2 can generate an alternating magnetic field when the first magnet 203 and the second magnet 204 rotate. Since the first magnet 203 and the second magnet 204 are arranged around the axis of the magnetic assembly 2, the state of the magnetic field generated by the magnetic assembly 2 also periodically changes. When the magnetic assembly 2 rotates once, one cycle is formed, so rotation of the magnetic assembly 2 can generate a stable magnetic field. The electromagnetic pump in the related art uses an alternating current to generate an alternating magnetic field, while the electromagnetic pump in the embodiment directly uses magnets to generate a varying magnetic field (variation in both strength and direction of the magnetic field), and thus electrical energy loss is less and conversion efficiency is higher. The electromagnetic pump in the embodiment can generate a stronger magnetic field without using a high voltage, and the production process is safer and more reliable.

The electromagnetic pump further includes a tank 3 and a liquid ejecting apparatus 4. An upper portion of the tank 3 made of a non-magnetic conductive material is provided with a feed pipe 303, and a lower portion of the tank 3 is provided with a slag discharging pipe. A liquid outlet region at the bottom of the tank 3 is provided with a first groove 301 and a second groove 302 surrounding the first groove 301, and a first end of the second groove 302 is communicated with the first groove 301. The liquid ejecting apparatus 4 includes a seal plate 401 attached above the liquid outlet region and made of a magnetic conductive material, and a flow guiding column 402 disposed above the seal plate 401. The liquid ejecting apparatus 4 further includes a nozzle 403 disposed outside the tank 3, and an end of the flow guiding column 402 facing away from the first groove 301 is communicated with the nozzle 403. The seal plate 401 is provided with a first through hole 4011 which is communicated with a second end of the second groove 302, and a bottom of the flow guiding column 402 is communicated with the first groove 301. The magnetic assembly 2 is disposed under the tank 3 and an axis of the flow guiding column 402 is in line with the axis of the magnetic assembly 2; and a gap is provided between the magnetic assembly 2 and the tank 3, so the magnetic assembly 2 is not contact with the tank 3, which can reduce friction. Optionally, incoming material enters the tank 3 from the feed tube 303, and remains in a liquid state, which can be ensured via a heating device provided in the tank 3. When the magnetic assembly 2 rotates to generate a stable magnetic field, the liquid metal in the tank 3 is driven by the magnetic field to flow into the second groove 302 via the first through hole 4011, then flow into the first groove 301 from the second groove 302, and then flows into the flow guiding column 402 from the first groove 301. The liquid metal in the flow guiding column 402 is driven by the magnetic field to overcome the resistance such as gravity and friction, and flows out from the nozzle 403. When the liquid metal flows through the nozzle 403, the pressure of the liquid metal is increased, and thus the purpose of supercharging is achieved.

In the embodiment, the strength and the speed of the alternating change of the magnetic field are mainly related to the number of magnet groups and the rotational speed of the electric motor 1. According to design requirements, one, two, three, four or even more magnet groups may be provided. Optionally, in order to ensure symmetry, the number of first magnets 203 is equal to that of second magnets 204.

In the embodiment, the axis of the flow guiding column 402, the axis of the magnetic assembly 2, and the axis of the electric motor 1 are in a straight line. In another embodiment, the flow guiding column 402 is only required to be in the magnetic field generated by the magnet groups and not required to be coaxial with the magnetic assembly 2. In another embodiment, the electric motor 1 drives the magnetic assembly 2 to rotate around the axis of the magnetic assembly 2 by means of a gear, a chain or other drive modes, and the electric motor 1 is not coaxial with the magnetic assembly 2.

Figure 5:
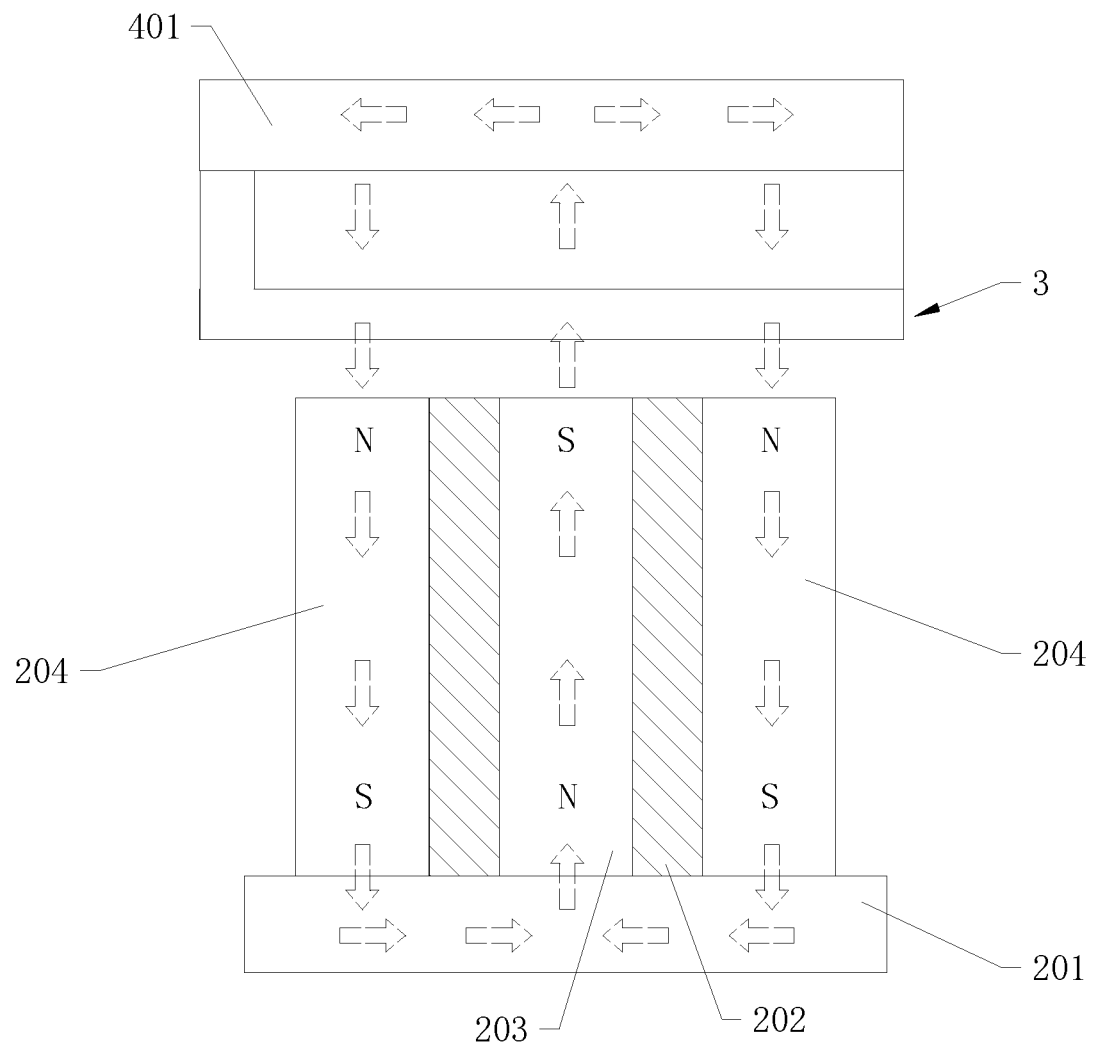
FIG. 5 is a schematic diagram of a magnetic field of the electromagnetic pump according to the embodiment 1.

As shown in FIG. 5, magnetic induction lines start from the first magnet 203, move upward, pass through the tank 3 made of a non-permeability magnetic material, enter the inside of the tank 3, pass through the liquid metal in the tank 3, enter the seal plate 401 made of the magnetic conductive material, then move towards both left and right directions, pass through the liquid metal and the tank 3 again, and enter the second magnet 204, and magnetic induction lines starting from the second magnet 204 pass through the base 201 made of the magnetic conductive material, and return to the first magnet 203, and thus a cycle is completed. If the tank 3 is made of the magnetic conductive material, the magnetic induction lines may move in both the left and right directions in the tank 3, thereby causing a large number of magnetic induction lines not to pass through the liquid metal, which may cause the electromagnetic pump to fail. Therefore, the tank 3 may be made of a non-magnetic conductive material. If the seal plate 401 is made of a non-magnetic conductive material, the magnetic induction lines starting from the first magnet 203 will pass upward through the seal plate 401, and will move neither in the left nor in the right direction in the seal plate 401, and thus magnetic induction line loop is prolonged and the work efficiency is reduced. Therefore, the seal plate 401 may be made of a magnetic conductive material. Similarly, the base 201 may be made of a magnetic conductive material.

Embodiment 2

Figure 6:
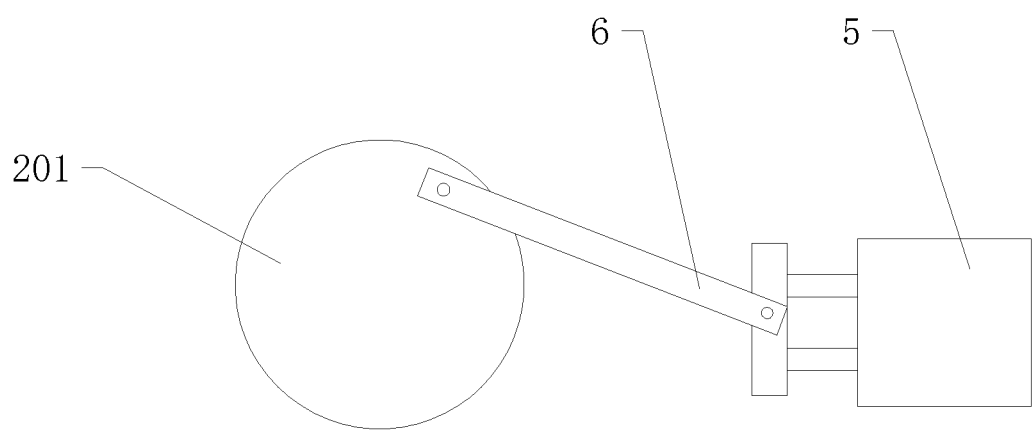
FIG. 6 is a structural diagram of a crank-link mechanism according to an embodiment 2.

As shown in FIG. 6, the difference between this embodiment and embodiment 1 is described below.

The drive mechanism is a crank-link mechanism including a cylinder 5 and a connecting rod 6, an end of the connecting rod 6 is hinged to the drive end of the cylinder 5, and the other end of the connecting rod 6 is hinged to the bottom of the magnetic assembly 2.

Optionally, the connecting rod 6 may convert a linear motion of the cylinder 5 into a circular motion of the magnetic assembly 2, so that the magnetic assembly 2 rotates around the axis of the magnetic assembly 2 to generate a varying magnetic field.

The terms "first", "second" and the like used herein are only for descriptive purposes and have no special meanings.

The technical features described in the above embodiments may be combined in any suitable manner if not in collision. In order to avoid unnecessary repetition, the present disclosure does not further describe various possible combinations.

What is claimed is:

1. An electromagnetic pump, comprising:
a drive mechanism and a magnetic assembly, wherein the magnetic assembly is configured to be driven by the drive mechanism to generate a varying magnetic field; and
a tank and a liquid ejecting apparatus, wherein a liquid outlet region at a bottom of the tank is provided with a first groove and a second groove surrounding the first groove, and a first end of the second groove is communicated with the first groove; and the liquid ejecting apparatus comprises a seal plate attached above the liquid outlet region and a flow guiding column disposed on the seal plate, wherein the seal plate is provided with a first through hole in communication with a second end of the second groove, and a bottom of the flow guiding column in communication with the first groove.

2. The electromagnetic pump of claim 1, wherein
the magnetic assembly comprises at least one magnet group, the at least one magnet group comprises a first magnet and a second magnet which are disposed at an interval, and a magnetic pole polarity of a preset end of the first magnet adjacent to the magnet group is opposite to a magnetic pole polarity of a preset end of the second magnet adjacent to the magnet group; and
the magnet group is configured to be driven by the drive mechanism to rotate around an axis of the magnetic assembly.

3. The electromagnetic pump of claim 2, wherein the magnetic assembly comprises at least two magnet groups, and a space is provided between each two adjacent ones of the magnet groups.

4. The electromagnetic pump of claim 2, wherein
the magnetic assembly further comprises a base connected to the drive mechanism and a positioning sleeve fixed on the base; and
the positioning sleeve is provided with a first placing groove and a second placing groove which are disposed at an interval, the first magnet is disposed in the first placing groove, and the second magnet is disposed in the second placing groove.

5. The electromagnetic pump of claim 1, wherein
the magnetic assembly is disposed under the tank and an axis of the flow guiding column is in line with an axis of the magnetic assembly; and
a gap is provided between the magnetic assembly and the tank.

6. The electromagnetic pump of claim 1, wherein an upper portion of the tank is provided with a feed pipe.

7. The electromagnetic pump of claim 1, wherein
the liquid ejecting apparatus further comprises a nozzle disposed outside the tank; and
an end of the flow guiding column facing away from the first groove is communicated with the nozzle.

8. The electromagnetic pump of claim 1, wherein
the drive mechanism comprises an electric motor; and
an axis of the magnetic assembly is in line with an axis of the electric motor.

9. The electromagnetic pump of claim 1, wherein
the drive mechanism comprises a crank-link mechanism; and
the crank-link mechanism comprises a cylinder and a connecting rod, a first end of the connecting rod is hinged to a drive end of the cylinder, and a second end of the connecting rod is hinged to the magnetic assembly.

10. The electromagnetic pump of claim 3, wherein
the magnetic assembly further comprises a base connected to the drive mechanism and a positioning sleeve fixed on the base; and
the positioning sleeve is provided with a first placing groove and a second placing groove which are disposed at an interval, the first magnet is disposed in the first placing groove, and the second magnet is disposed in the second placing groove.

* * * * *